Jan. 11, 1927. 1,614,335
W. WRIGHT
CAR ROOF
Filed Jan. 9, 1924   6 Sheets-Sheet 1
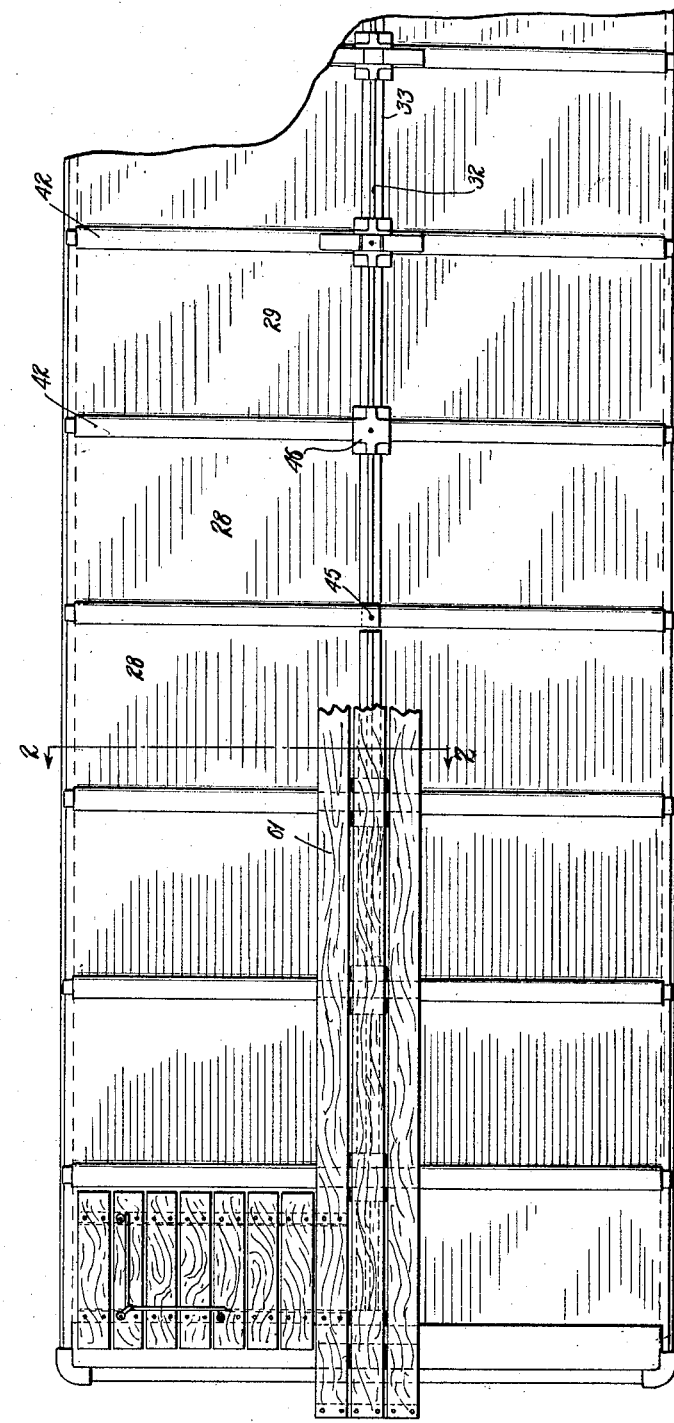

Jan. 11, 1927. 1,614,335
W. WRIGHT
CAR ROOF
Filed Jan. 9, 1924  6 Sheets-Sheet 2
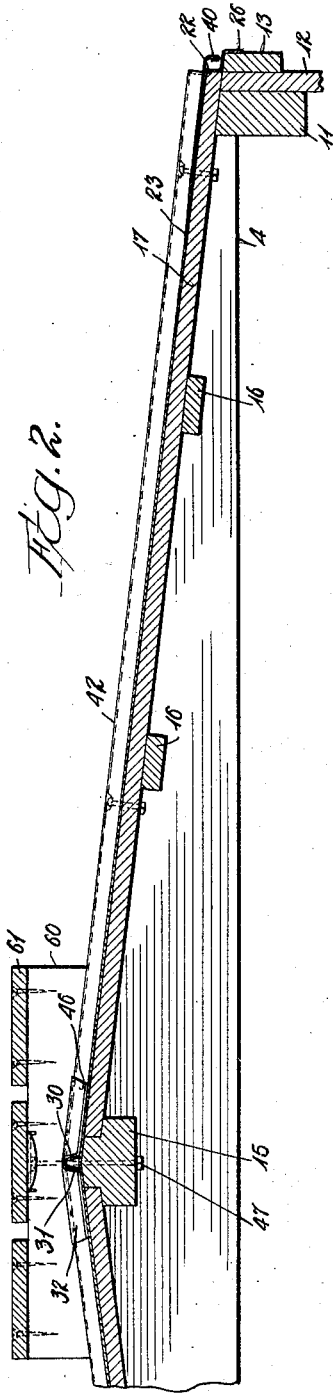
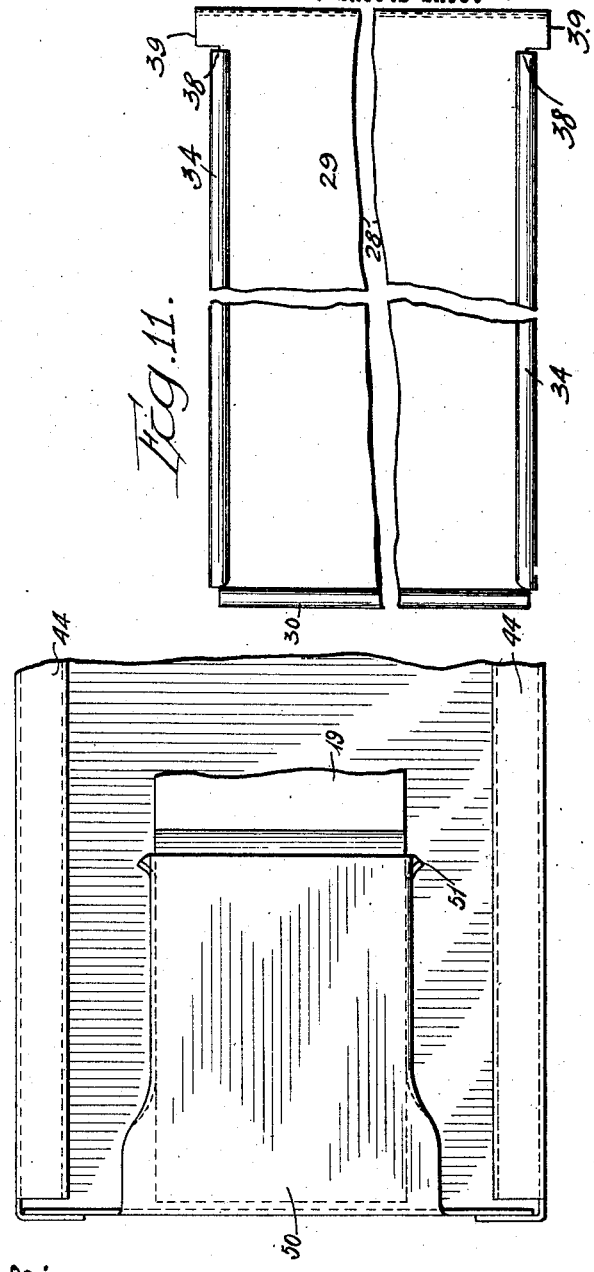
Inventor:
William Wright
By Munday, Clarke & Hauxhurst
Attys.

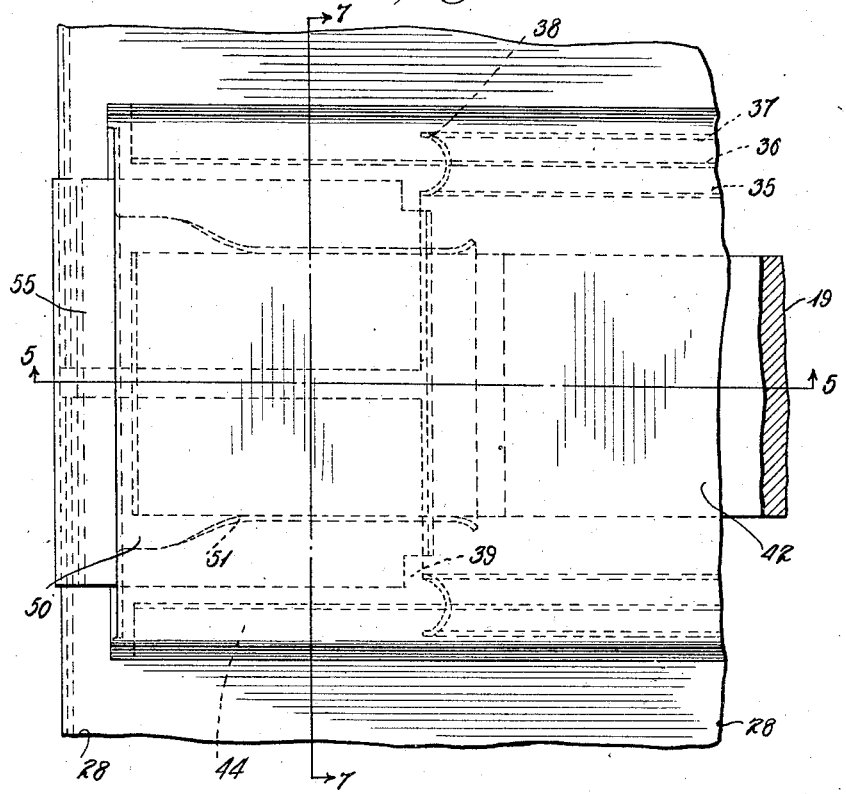
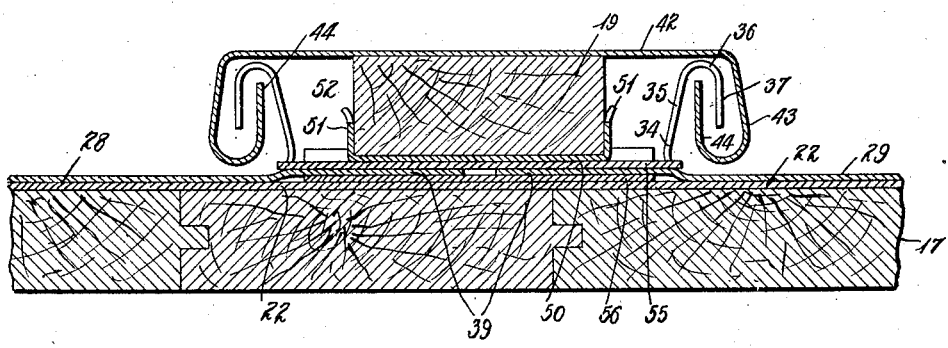

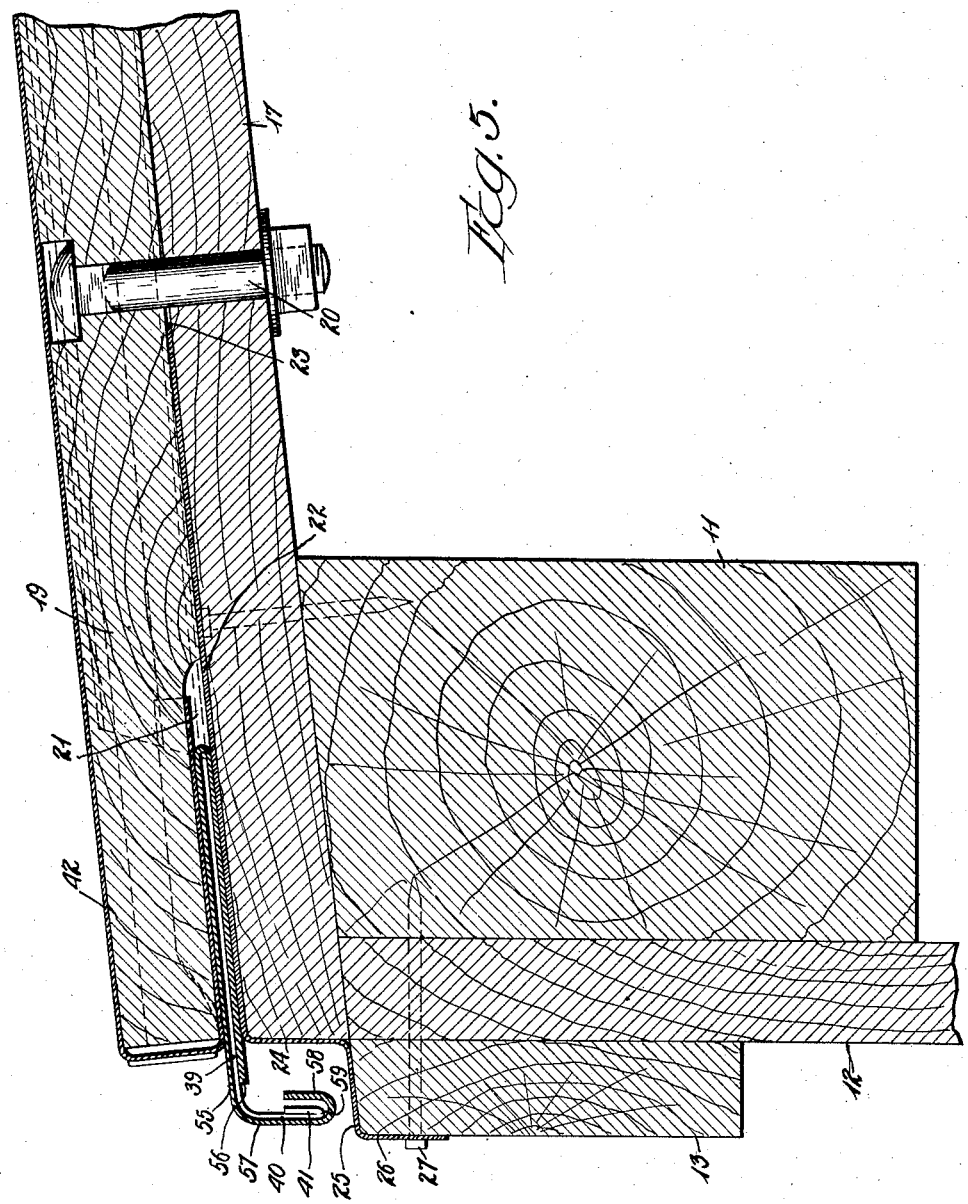

Jan. 11, 1927.　　　　W. WRIGHT　　　　1,614,335
CAR ROOF
Filed Jan. 9, 1924　　6 Sheets-Sheet 5

Inventor:
William Wright

Jan. 11, 1927.

W. WRIGHT

CAR ROOF

Filed Jan. 9, 1924  6 Sheets-Sheet 6

1,614,335

Inventor:
William Wright
By Munday Clarke Carpenter
Attys.

Patented Jan. 11, 1927.

1,614,335

UNITED STATES PATENT OFFICE.

WILLIAM WRIGHT, OF CHICAGO, ILLINOIS, ASSIGNOR, BY MESNE ASSIGNMENTS, TO CHICAGO-CLEVELAND CAR ROOFING COMPANY, OF CHICAGO, ILLINOIS, A CORPORATION OF DELAWARE.

CAR ROOF.

Application filed January 9, 1924. Serial No. 685,250.

This invention relates in general to improvements in car roof construction and more particularly to improvements in the "outside metal type" of car roofs. The objects of the invention are the production of a metallic car roof of the above mentioned type which is of simple form, may be manufactured at reasonable cost is readily and easily applied with attendant reduction in cost of application, which will not require frequent repair and replacement and which will effectively protect the car against the elements; together with such other objects and advantages of the invention as are found to obtain in the structure hereinafter set forth and claimed.

In the accompanying drawings, forming a part of this specification, and showing, for purposes of exemplification, a preferred form and manner in which the invention may be embodied and practiced, but without limiting the claimed invention specifically to such illustrative instance or instances.

Figure 1 is a top plan view of a part of a car roof embodying my invention.

Fig. 2 is a vertical cross section taken on the line 2—2 of Fig. 1.

Fig. 3 is an inverted plan view of an end of a mullion cap and a mullion enclosed thereby.

Fig. 4 is a top plan view showing the roof sheets, flashing, mullion, and mullion cap in assembled relation at one end of a mullion.

Fig. 5 is a section taken on the line 5—5 of Fig. 4.

Fig. 7 is a section taken on the line 7—7 of Fig. 4.

Fig. 11 is a top plan view of one of the roof sheets.

Figure 6:
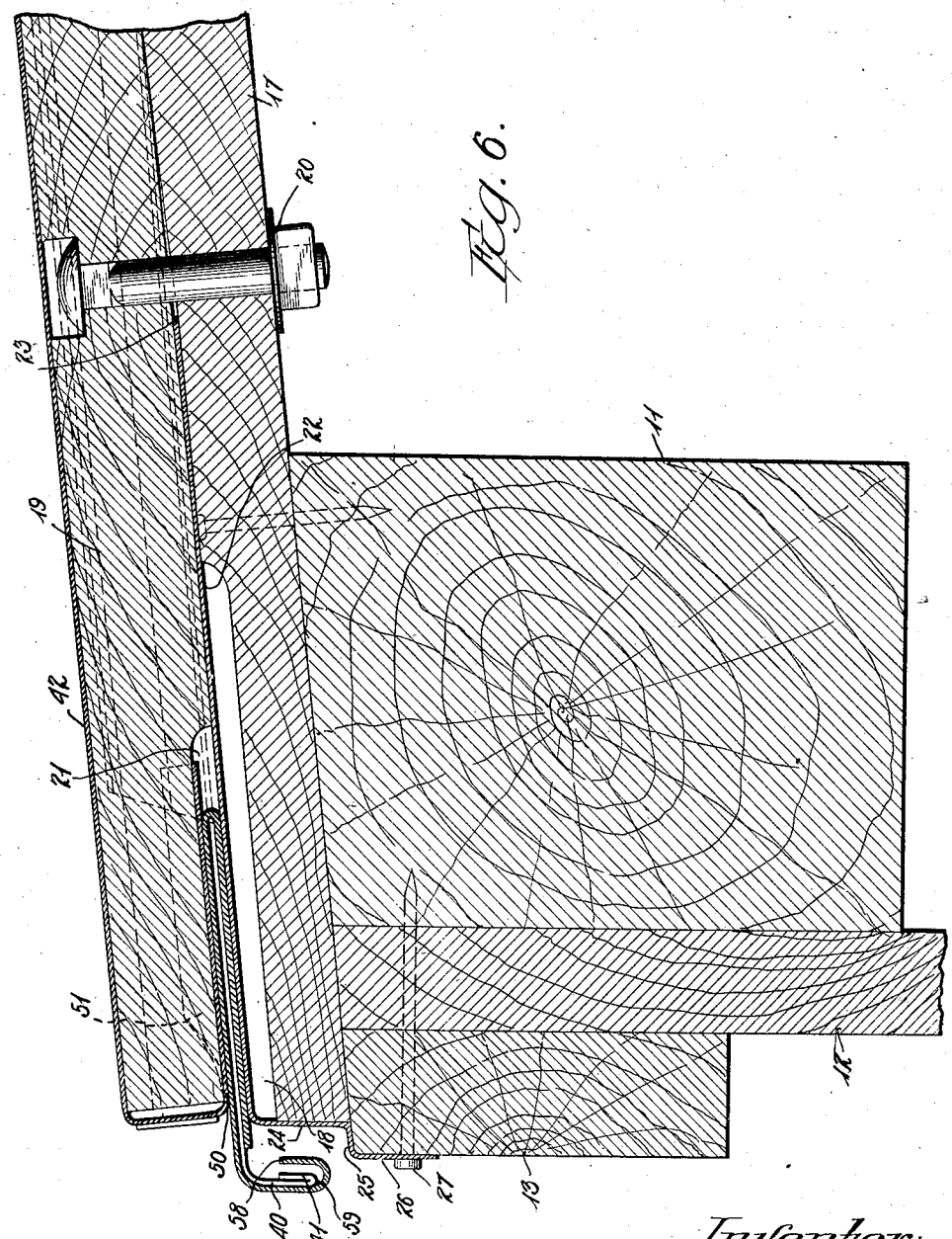
Fig. 6 is a view similar to Fig. 5 but showing the relative position of the parts as applied to an inside sheathing having its eaves gained.
Figure 8:
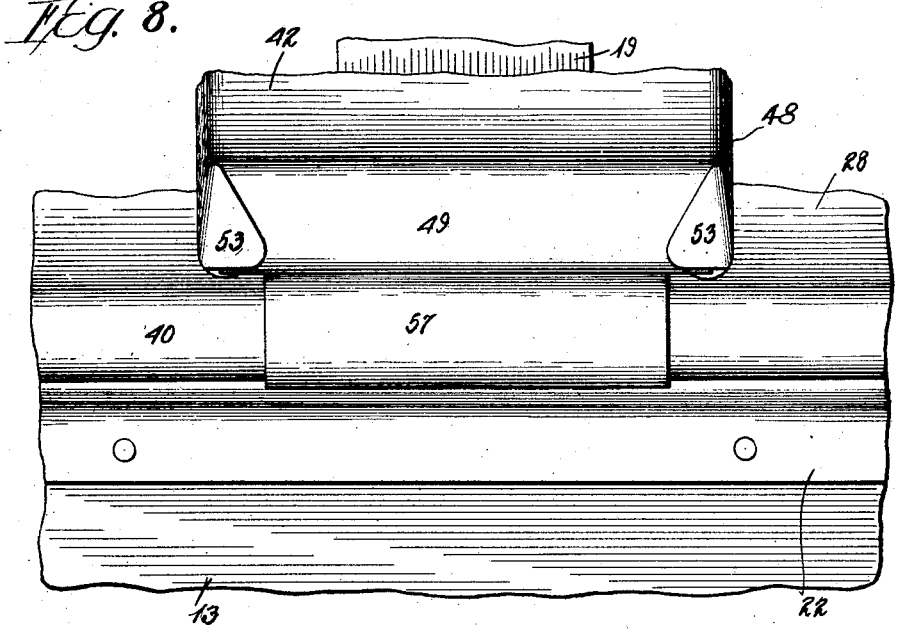
Fig. 8 is an end elevational view taken at the eaves of the roof and looking towards the ridge, showing the relative positions of the flashings, roof sheets, mullion cap and mullion.
Figure 9:
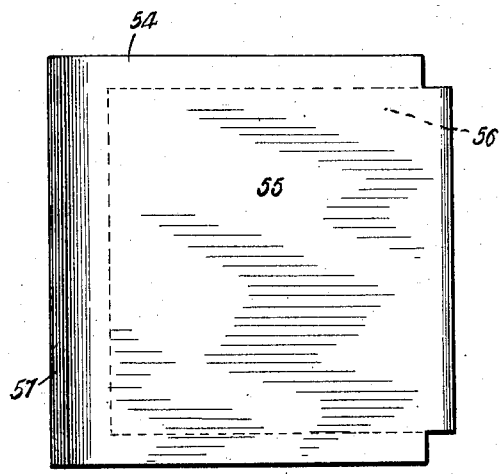
Fig. 9 is a top plan view of a flashing piece.
Figure 10:
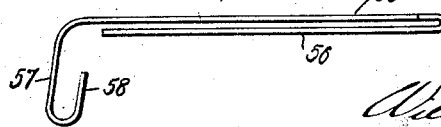
Fig. 10 is a side elevation of the same.

The drawings show wooden side plates 11, side sheathing 12, side fascia 13, carline 14, ridge pole 15 and purlins 16. Secured to said purlins, ridge pole and carlines is the usual inside wooden roof sheathing 17, and as shown the eaves edges of said inside sheathing terminate just above the outer face of said side sheathing 12. It may be that the metallic coverings, to be hereinafter described, for said roof sheathing 17, may be required for cars whose eaves edges are gained out, as illustrated at 18 in Fig. 6, or for roof sheathing which is not gained out, as illustrated in Fig. 5. In either event the metallic covering may be manufactured and applied to either type of sheathing in much the same manner. In order to prevent longitudinal shifting of the roof sheets or metallic coverings for said roof sheathing, mullions 19 are secured thereon by bolts 20 at spaced intervals transversely to the car and are gained out at the eaves edges as shown at 21. In order to weather-proof the eaves edges of the car a metallic flashing 22 is provided which extends longitudinally of the car, said flashing covering the roof sheathing to a point 23 back of the side plates, and covering the gained portions as shown in Fig. 6. The flashing has a depending portion 24 which encloses the ends of the roof sheathing boards, and which is bent laterally at 25 to engage the top of the fascia and then flanged downwardly at 26 to engage the side of said fascia; and the flange 26 may be secured to said fascia by any suitable means such as nails 27. Metallic roof sheets 28 are arranged in the spaces between the mullions, each of said roof sheets comprising a main body 29 having an inverted U shaped flange 30 at its ridge end. The adjacent inverted U shaped flanges of roof sheets disposed on opposite sides of the ridge are lapped one over the other at 31 and these lapped flanges are capped by inverted channel ridge caps 32 provided with outwardly extending bottom flanges 33 that rest on the main body 29 of said roof sheets. These ridge caps serve to further weather-proof these joints and also retain the sheets against material movement towards the eaves while permitting a proper amount of movement longitudinally of the car. The sides of said roof sheets 28 adjacent the mullions are provided with upwardly projecting flanges 34 comprising a portion 35 extending upwardly and inclined inwardly and said portions 35 are bent at 36 providing a downwardly directed flange portion 37 terminating above the main body 29 of the roof sheet. These side flanges extend from the ridge to a point 38 short of the eaves edge of said sheets and the unflanged portions at each side of the roof sheets are bent to form at each side an offset ear or extension 39 of said roof sheets that extends under the eaves ends of said mullions, as shown, into the gained out portion of said mullions, and the eaves edges of said roof sheets are flanged downwardly at 40, the flange 40 terminating in a rebent portion 41 that lies against the inner side of said flange to finish off said edge and to strengthen it. When these roof sheets are applied to the car, the depending flange 40 is spaced from said flashing 22 and the eaves edge of the car roof sheathing and depends over the outside lines of the roof so that the sheets may accommodate themselves to the movements of the car and yet not cause chafing of the metal by reason of contact with said flashing.

To weather-proof the mullions and the space between the side flanges of adjacent roof sheets mullion caps 42 are slid over the mullions, said mullion caps having depending side flanges 43 rebent to provide an upwardly directed flange 44 that is hooked into the space provided between the portions 35 and 37 of the roof sheet side flanges, and such interlocking engagement permits proper amount of movement of said roof sheets with respect to the mullions and mullion caps and also serves to hold said roof sheets in proper position on the roof sheathing. At their ridge ends the mullion caps are lapped as shown at 45 and to weather-proof said joints and also to hold said mullion caps in place, corner caps 46 are provided which are secured to the substructure by bolts 47 that pass through said lapped edges of said mullion caps. At the eaves ends of said mullion caps, the tops 48 of the caps are bent down at 49 to enclose the mullion and close the end of the mullion cap, and this portion 49 is provided with an inwardly directed flange or tongue 50 which engages the under side of the gained portion of said mullion and the mullion caps are formed with portions to engage the sides of said mullions, as shown. The sides of said tongues 50 are flanged upwardly to provide flanges 51 that engage tightly the sides 52 of said mullions and serve to maintain said mullion caps against relative transverse movement with respect to said mullions, and also serve together with said tongue 50 to hold said caps against upward movement. The sides of said mullion caps are bent at 53 towards each other at the eaves end to further close the ends of the caps. The rebend 44 of the mullion-cap flanges is spaced further from the top face of the roof sheet body than the top rebend of the side-flange of the roof-sheet is spaced from the under face of the top of the mullion-cap, so that chafing of the sheet-body against the aforesaid rebend 44 of the mullion-cap flange, where both are exposed to the weather, is prevented.

In order to weather-proof the space beneath said mullions at the eaves of the car, flashing clips or pieces 54 are provided having a top 55 that covers the adjacent ears or extensions 39 and a return bent portion 56 that is hooked under said ears and lies between said ears and the flashing thereebeneath, and at the outer end the portion 55 is flanged downwardly at 57 over the adjacent depending flanges of the roof sheets and the extremity 58 is bent upwardly and hooked around the lower edges 59 of said depending flanges of the roof sheets. These flashing clips or pieces 54 together with the extensions 39 serve to hold the eaves edges of said roof sheets against too great upward movement. The usual running board saddles 60 are secured over the mullion caps and the running boards 61 are secured on said saddles in any desirable manner.

The invention as hereinabove set forth is embodied in a particular form of construction but may be variously embodied within the scope of the claims hereinafter made.

I claim:

1. A car roof embodying roof sheathing, mullions secured at intervals transversely along the top of said sheathing, roof sheets occupying the spaces between said mullions on opposite sides of the ridge, a flashing overlapping said roof sheathing at the eaves and having a portion depending over the side of the car, said roof sheets having upwardly directed side flanges each terminating in a portion spaced from the body of its sheet, and said sheets also having adjacent the eaves of the car unflanged side portions extending under adjacent mullions, the eaves ends of said roof sheets being flanged downwardly over the sides of the car and spaced therefrom, flashing clips each overlapping adjacent unflanged side portions of neighboring roof sheets and overlapping the adjacent depending flanges of said sheets, and mullion caps fitting over said mullions and enclosing the said upwardly directed side flanges of said roof sheets.

2. A car roof embodying roof sheathing, mullions secured at intervals transversely along the top of said sheathing, roof sheets occupying the spaces between said mullions, a flashing overlapping said sheathing at the eaves and having a portion depending over the side of the car, said roof sheets having upwardly projecting side flanges each terminating in a downwardly directed portion spaced from the body of its sheet, said flanges extending substantially from the ridge to a short distance from the eaves ends of the mullions, the portions of the sheets beyond said flanges being extended under the eaves ends of the mullions, the eaves ends of said sheets being flanged downwardly in spaced relation to the sides of the car and said flashing, flashing clips respectively embracing adjacent portions of said roof sheets extending under respectively corresponding mullions, and mullion caps having side flanges for loosely enclosing the adjacent side flanges of the roof sheets, the eaves ends of said mullion caps being folded to enclose the ends of said mullions and portions of said caps being formed to engage the respective mullions to prevent transverse movement of said caps with respect to their corresponding mullions.

3. In a car roof, in combination: roof sheathing; mullions secured at intervals transversely along the top of said sheathing; roof sheets occupying the spaces between said mullions, on opposite sides of the ridge, each of said roof sheets having along its ridge end a flange, said flanges of roof sheets on opposite sides of the ridge mutually engaging each other; ridge caps enclosing said engaged flanges, said roof sheets having side flanges bent upwardly and thence downwardly, said flanges stopping short of the eaves line of the car, the portions of said roof sheets beyond said flanges forming extensions arranged beneath the eaves ends of the mullions, the eaves ends of said sheets being flanged downwardly and said flanges being spaced from the eaves edge of the car; mullion caps enclosing the mullions and side flanges of roof sheets adjacent said mullions, the ridge ends of said mullion caps being rigidly secured to the car substructure, and the eaves ends of said caps being flanged to enclose the ends of said mullions, portions of said flanges engaging the sides of said mullions to hold said caps against relative transverse movement.

4. In a car roof, in combination: roof sheathing; mullions secured at intervals thereon; roof sheets occupying the spaces between said mullions on opposite sides of the ridge, each of said roof sheets having along its ridge end a flange, said flanges of roof sheets on opposite sides of the ridge mutually engaging each other; ridge caps enclosing said flanges, the side edges of said roof sheets being flanged and said flanges stopping short of the eaves line of the car leaving an extension on each side of each sheet extending under the adjacent mullion, the eaves ends of said roof sheets being flanged downwardly and said flanges depending and spaced from the outside lines of the eaves of the roof; and mullion caps enclosing said mullions and the side flanges of roof sheets adjacent said mullions.

5. In a car roof, in combination: roof sheathing; mullions secured at intervals thereon; roof sheets occupying the spaces between said mullions; each of said roof sheets having along its ridge end a flange; ridge caps enclosing adjacent ridge end flanges; the side edges of said roof sheets being flanged; mullion caps enclosing the mullions and the roof sheet side flanges adjacent said mullions, the eaves ends of said mullion caps being flanged to enclose the ends of said mullions; portions of said mullion caps engaging the sides of said mullions at the eaves ends of the mullions.

6. In a car roof, in combination: roof sheathing, mullions secured thereon; roof sheets occupying the spaces between said mullions, each of said roof sheets having along its ridge end a flange; caps enclosing adjacent ridge flanges; the side edges of said roof sheets being flanged; mullion caps enclosing said mullions and the side flanges of said roof sheets, the eaves ends of said mullion caps being closed and portions of said mullion caps engaging the sides of said mullions and holding said caps against relative movement with respect to said mullions.

7. In a car roof, in combination: roof sheathing, mullions secured thereon; roof sheets occupying the spaces between said mullions, each of said roof sheets having along its ridge end a flange; caps enclosing adjacent ridge flanges; the side edges of said roof sheets being flanged; mullion caps enclosing said mullions and the side flanges of said roof sheets; the tops of said mullion caps at the eaves ends being bent downwardly and thence inwardly to engage the under side of said mullions; the sides of said inwardly turned portion being flanged upwardly to engage the sides of said mullions.

8. A car-roof mullion cap comprising a top portion and depending side flanges, the top portion at the eaves end being bent downwardly and then inwardly, the sides of said inwardly bent portion being flanged upwardly.

9. A car-roof sheet having a main body; side flanges; a ridge flange; an eaves flange located in a plane beneath the main body; said side flanges being of angular form and projecting upwardly from said main body terminating at a point short of the eaves edge of the sheet, the unflanged portions of said sides forming flat extensions at the sides of and in the plane of said main body, and the eaves end of the latter having a downwardly extending flange, the flat extensions being disposed inwardly of the eaves end of the sheet toward the ridge end thereof.

10. A car-roof mullion cap comprising a top portion and depending side flanges, the top portion at the eaves end being bent downwardly and then inwardly, the eaves end of the cap being closed and provided inwardly with integral portions bent to grip the sides of a mullion so as to prevent lateral shifting of the mullion-cap in respect to such mullion.

11. A car roof embodying spaced mullions, roof sheets arranged between said mullions and having side flanges spaced from the latter, and mullion caps respectively cooperating with adjacent roof sheet flanges to form flexible watertight joints, the top of each mullion cap at the eaves end extending downwardly over the end of the adjacent mullion and extending inwardly under said mullion, and the sides of said inwardly extending portion being flanged upwardly and fitting against the sides of said adjacent mullion.

12. A car roof embodying roof sheathing, mullions secured at intervals along the top of said sheathing, roof sheets occupying spaces between said mullions on opposite sides of the ridge, a flashing overlapping said roof sheathing at the eaves and having a portion depending over the side of the car, each of said roof sheets having side flanges directed upwardly and terminating in a downwardly directed portion spaced from the body of its sheet, said flanges extending substantially from the ridge to a short distance from the eaves ends of the mullions, the portion of the sheet beyond said flanges being extended under the eaves ends of the adjacent mullions, and the eaves ends of said sheets being flanged downwardly in spaced relation to the correspondingly adjacent sides of the car and flashing, separate flashing pieces each enclosing the adjacent extensions of said roof sheets beneath the neighboring mullion, and mullion caps having side flanges loosely enclosing the side flanges of roof sheets adjacent said mullions, the eaves ends of said mullion caps being folded to enclose the ends of the respective mullions and portions of said caps being formed to engage the respectively adjacent mullions so as to hold said cap against transverse movement.

13. A car roof embodying roof sheathing, mullions secured at intervals transversely along the top of said sheathing, roof sheets occupying the spaces between said mullions on opposite sides of the ridge, a flashing overlapping said roof sheathing at the eaves and having a portion depending over the side of the car, said roof sheets having side flanges directed upwardly and each terminating in a portion spaced from the body of its sheet, the unflanged sides of said sheets at the eaves of the car extending under adjacent mullions, the eaves ends of said roof sheets being flanged downwardly over the sides of the car and spaced therefrom, flashing clips respectively overlapping the adjacent unflanged sides of said roof sheets, and mullion caps fitting over said mullions and the respectively adjacent side flanges of said roof sheets, each of said clips having a portion overlying the adjacent unflanged sides of neighboring roof sheets and having a rebent portion turned under said sides and directed outwardly and having also a depending flange terminating in a return bend hook that encloses the adjacent depending flanges of neighboring roof sheets.

14. A car roof involving spaced mullions, roof sheets arranged between said mullions and having side flanges bent upwardly, said flanges terminating short of the eaves line of the car and the portions of the roof sheets beyond said flanges forming extensions disposed beneath the eaves ends of the mullions, the eaves ends of said sheets having downwardly extending flanges spaced from the respective eaves edges of the car, mullion caps enclosing the mullions and adjacent side flanges of adjoining roof sheets, the eaves end of each cap being flanged to enclose the end of the mullion associated therewith and having portions engaging the sides of the mullion to support the cap against relative transverse movement.

15. A car roof embodying transversely extending spaced mullions, roof sheets occupying the spaces between said mullions, the side edges of said roof sheets having flanges terminating short of the eaves line of the car so as to leave an extension on each side of each sheet projecting under the adjacent mullion, the eaves ends of said roof sheets having downwardly extending flanges spaced from the outside lines of the eaves of the roof, and mullion caps respectively enclosing said mullions and the proximate side flanges of roof sheets adjacent thereto.

16. A car roof embodying transversely extending spaced mullions, and roof sheets occupying the spaces between said mullions, the side edges of said roof sheets having flanges terminating short of the eaves line of the car and leaving an extension on each side of each sheet projecting under the adjacent mullion, and the eaves ends of said roof sheets being provided with downwardly extending flanges spaced from the outside lines of the eaves of the roof.

17. A car roof embodying spaced mullions, roof sheets arranged between said mullions, the side edges of said roof sheets being flanged, and mullion caps respectively enclosing the mullions and the proximate side flanges of adjacent roof sheets, the eaves ends of said caps being flanged to enclose the ends of the respectively corresponding mullions and portions of said caps engaging the sides of the respective mullions toward the eaves ends of the latter.

18. A car roof embodying mullions, roof sheets occupying the spaces between said mullions, the side edges of said roof sheets being flanged, and mullion caps respectively enclosing said mullions and the side flanges of said roof sheets, the eaves ends of said mullion caps being closed and portions of said caps engaging the sides of the respective mullions to support said caps against relative movement with respect to said mullions.

19. A car roof involving mullions, roof sheets arranged between said mullions and having flanged side edges, and mullion caps respectively enclosing said mullions and the proximate side flanges of adjacent roof sheets, the tops of said mullion caps at the eaves ends being bent downwardly and thence inwardly so as to extend under the respectively adjacent mullions, and said caps having means for engaging the respective mullions to prevent said caps from moving transversely with respect thereto.

20. A car roof mullion cap having a top portion which at the eaves end is bent downwardly and then inwardly, the sides of said inwardly bent portion being flanged upwardly.

21. A car roof sheet having a main body, upwardly projecting side flanges having angularly disposed portions, and an eaves flange extending downwardly from the main body, said side flanges terminating at a point short of the eaves edge of the sheet, and the unflanged portions of said sides forming extensions at the sides of said main body, presenting flat surfaces disposed in the plane of the main body of the sheet.

22. A car roof mullion cap having a top portion and side flanges, said top portion at the eaves end being bent downwardly and then inwardly, said inwardly directed portion being formed so as to constitute means preventing lateral shifting of the cap with respect to the mullion.

In testimony whereof I have hereunto set my hand.

WILLIAM WRIGHT.